United States Patent [19]

Tutein

[11] 4,010,135

[45] Mar. 1, 1977

[54] COMPOSITION AND METHOD FOR DISPERSING HIGH MOLECULAR WEIGHT FLOCCULANT POLYMERS IN WATER

[75] Inventor: Thomas R. Tutein, Cary, Ill.

[73] Assignee: Chemed Corporation, Cincinnati, Ohio

[22] Filed: Sept. 3, 1975

[21] Appl. No.: 610,034

[52] U.S. Cl. .............. 260/29.6 HN; 260/29.6 BE; 260/29.6 E; 260/29.6 M; 260/29.6 H; 260/29.6 SQ

[51] Int. Cl.² .......................................... C08L 33/02

[58] Field of Search ............ 260/29.6 HN, 29.6 BE, 260/29.6 Z, 29.6 M, 29.6 H, 29.6 SQ, 42, 29.2 EP; 210/54 A, 54 C

[56] References Cited

UNITED STATES PATENTS

| | | | |
|---|---|---|---|
| 3,402,137 | 9/1968 | Fisher et al. | 260/29.6 Z |
| 3,657,182 | 4/1972 | Jolly | 260/29.6 SQ |

*Primary Examiner*—M. J. Welsh
*Attorney, Agent, or Firm*—Charles L. Harness

[57] ABSTRACT

This invention provides an improved composition and method for dispersing high molecular weight flocculant polymers and copolymers used for water and waste treatment by the combination of the polymer with an inert additive and a bonding agent.

14 Claims, No Drawings

COMPOSITION AND METHOD FOR DISPERSING HIGH MOLECULAR WEIGHT FLOCCULANT POLYMERS IN WATER

The present invention relates to a new improved composition and method for dispersing high molecular weight flocculant polymers and copolymers in water.

It is well known in the art that high molecular weight polymers, with molecular weights in the range of about one to about twenty million, are very difficult to disperse or dissolve in water, when preparing feed solution. In dissolving such polymers for use in water treatment, conventionally, dry powdered polymer is fed slowly and carefully into the vortex of a vigorously stirred body of water. However, it is frequently difficult to do this in actual operation for a number of reasons. Often, for example, personnel tend to simply dump the powder into the water, start up the stirrer, and expect the material to dissolve. Under such circumstances, the polymers swell and ball up into extremely viscous masses, with dry and unswollen material inside which the water can not even reach to dissolve. Many undissolved so-called "fish eyes" result which may be seen floating in the water. Under normal circumstances, it is impossible to get such a floating mass to completely dissolve even after hours or even days of stirring. For this reason, a considerable amount of work has been done attempting to develop improved and useful methods for producing dispersions and solutions of high molecular weight flocculant polymers in water. Sometimes the dry powdered polymer is wetted with a water soluble organic solvent, or it may be wetted with a surface active material in an attempt to improve the penetration into the particles, at the same time acting to separate them. (See, for instance, Dexter, U.S. Pat. No. 3,839,500 and Keas, U.S. Pat. No. 3,817,891). Considerable fractions of water soluble inert salts, such as sodium chloride, may be used in order to separate the particles of polymer and reduce their tendency to ball up into insoluble masses. Mechanical feed devices, and eductors operated by flowing water have been described and are commercially used for this purpose. Sometimes such devices work well with cold water, but may give considerable difficulty when used with hot water.

The present invention is based upon the discovery that certain types of ingredients, when blended with the polymer, produce a network (or bridging) which retards rather than accelerates wetting of the polymer particles. This invention is based on the principle that the rate of solution of the polymer particle in water decreases with decreasing polymer particle surface area. The slower the rate of solution, the fewer the insoluble polymer masses formed.

In the compositions used for the practice of the present invention, the particle size is temporarily increased in order to significantly decrease the initial rate of solution. This yields a polymer particle which is initially completely insoluble, and allows the polymer particles to become completely separated and dispersed in the water prior to the process of solution. The particle can not begin to dissolve until the particles are completely dispersed in the water to form the proper solution network.

According to this invention, the polymer particle and inert ingredient are compounded with small amounts of a bonding agent to form rigid bridged networks of polymer and inert ingredient. These bridged particles are insoluble in water until the bonds are broken between the polymer particles and the inert ingredients. These bonds do not break until the particles are completely dispersed in the water.

The polymers and copolymers which may be used in this invention can be cationic, anionic or nonionic. Commercially available polymers and copolymers of acrylamide, polystyrene sulfonate, polyethylene oxide, and the like, having polymer molecular weights of about 0.1 to 20 million are found useful.

Inert ingredients include materials such as sodium chloride, sodium sulfate (anhydrous and hydrated), soda ash, sodium sulfite, magnesium sulfate, sodium bisulfate, sodium hydrosulfite and lime.

Bonding agents include materials such as ethylene glycol, propylene glycol, diethylene glycol, and acetic acid.

Polymers and copolymers which may be used in the practice of this invention include, for example, polymers and copolymers of acrylamide or methacrylamide, the water soluble salts of acrylic and/or methacrylic acid, and copolymers with cationic polyacrylates such as dialkylaminoalkyl acrylates or methacrylates or quaternized dialkylaminoalkyl acrylates or methacrylates, and also copolymers with vinylic monomers.

The copolymers of acrylamide and acrylates may be prepared by copolymerization of the monomers, or by partial hydrolysis of the polyacrylamide after polymerization. Other polymerizable vinyl compounds such as vinyl acetate, acrylonitrile, methacrylonitrile, vinyl alkyl ethers, vinyl halides, and the like may be employed as secondary or ternary components of the polymer to impart desired properties to the product.

Based on 100 parts by weight of polymer, the inert ingredients are added in an amount from about 10% to about 80% by weight and desirably about 40% to about 60% by weight. On the same basis, the amount of bonding agent may vary from about 0.1% by weight to about 20% by weight and desirably about 1% to about 10% by weight.

Practice of the present invention will become more apparent from the following examples wherein all parts are given by weight unless otherwise indicated.

EXAMPLE 1

Fifty parts by weight of Reten 220, a cationic acrylamide manufactured by Hercules, Inc. was mixed until uniform with 46 parts by weight of sodium chloride. Next, 4 parts by weight of ethylene glycol was added and mixed until uniform. The final product was found to be completely dispersible in water.

EXAMPLE 2

Forty five parts by weight of Separan MG-700, an anionic polyacrylamide by Dow Chemical Co. was mixed until uniform with 5 parts by weight of ethylene glycol. Next, 50 parts by weight of sodium sulfate, anhydrous was added and mixed until uniform. The final product, when added to stirred water was found to completely disperse in a few seconds.

In comparison, a 0.33% solution of Dow Separan MG-700 in water was prepared by simply dumping the powder in stirred water. The powder was found to ball up and produce lumps and "fish eyes" which took days to dissolve. If the same amount of Separan MG-700 were to be slowly and carefully dusted into the vortex produced by vigorous stirring in a solution tank, the material would dissolve only after several hours.

The solutions so prepared, of course, may be used for any purpose for which polyelectrolytes are usually needed: sludge dewatering, coagulation or flocculation, etc. Among the advantages which are obtained by the practice of this invention are reduction in maintenance and down time, since there is less chance of producing thick coatings and deposits of undissolved material in the dissolving tanks, which would have to be cleaned out by hand; an increase in process capacity because of the ease and speed of preparing the feed solution; more concentrated feed solutions can be prepared if necessary; and lower addition costs since the labor costs are greatly reduced.

It is to be understood that the practice of this invention is not limited to the specific example given, but may cover any effective equivalent composition. Numerous other modifications will become apparent to those skilled in the art and accordingly, it is to be realized that the foregoing description is given merely by way of illustration, and that various modifications may be made therein without departing from the spirit of this invention.

What is claimed is:

1. A new and improved composition for preparing solutions of high molecular weight polymers or copolymers, such solutions to be used in treating water and waste systems which consists of a combination of the flocculant polymer or copolymer with an inert additive and a bonding agent selected from the group consisting of ethylene glycol, propylene glycol, diethylene glycol, or acetic acid; said compositions, when added to water, producing initial slowing of the rate of solution of the polymer or copolymer, allowing time for dispersion and separation of the solid particles, thereby expediting final solution, and preventing the formation of agglomerates of the polymers or copolymers.

2. The composition of claim 1, wherein the polymer or copolymer is selected from the group consisting of acrylamide, polystyrene sulfonate, or polyethylene oxide, said polymer or copolymer having a molecular weight of about 0.1 to about 20 million.

3. The composition of claim 1, wherein the inert additive is selected from the group consisting of sodium chloride, sodium sulfate, soda ash, sodium sulfite, magnesium sulfate, sodium bisulfate, sodium hydrosulfite, or lime.

4. The composition of claim 1, wherein the polymer or copolymer is selected from the group consisting of acrylamide, methacrylamide, the water soluble salts of acrylic and/or methacrylic acid, and their copolymers with cationic polyacrylates or with vinylic monomers.

5. The composition of claim 1, wherein the copolymer is selected from the group consisting of copolymers of acrylamide and copolymers of acrylates prepared by copolymerization of the monomers with vinyl moiety compounds selected from the group consisting of vinyl acetate, acrylonitrile, methacrylonitrile, vinyl alkyl ethers, and vinyl halides; and partial hydrolysis products thereof.

6. The composition of claim 1, wherein based on the weight of polymer, the inert ingredients are added in amounts from about 10 percent to about 80 percent by weight, and the amount of bonding agent varies from about one-tenth percent by weight to about twenty percent by weight.

7. The composition of claim 6, wherein the inert ingredients are added in an amount from about 40 percent to about 60 percent by weight, and the amount of bonding agent varies from about one percent to about ten percent by weight.

8. A new and improved method for preparing solutions of high molecular weight flocculant polymers or copolymers in water, for use in treating water and waste systems, which comprises combining the flocculant polymer or copolymer with an inert additive and a bonding agent selected from the group consisting of ethylene glycol, propylene glycol, diethylene glycol, or acetic acid as the sole effective ingredients, said combination slowing the rate of solution of the polymer or copolymer, thereby improving the dispersion of the particles of said polymer or copolymer.

9. The method of claim 8, wherein the polymer or copolymer is selected from the group consisting of acrylamide, polystyrene sulfonate, or polyethylene oxide, having a molecular weight of about 0.1 to about 20 million.

10. The method of claim 8, wherein the inert additive is selected from the group consisting of sodium chloride, sodium sulfate, soda ash, sodium sulfite, magnesium sulfate, sodium bisulfate, sodium hydrosulfite, or lime.

11. The method of claim 8, wherein the polymer or copolymer is selected from the group consisting of acrylamide, methacrylamide, the water soluble salts of acrylic and/or methacrylic acid, and their copolymers with cationic polyacrylates or with vinylic monomers.

12. The method of claim 8, wherein the copolymer is selected from the group consisting of copolymers of acrylamide and copolymers of acrylates prepared by copolymerization of the monomers with vinyl moiety compounds selected from the group consisting of vinyl acetate, acrylonitrile, methacrylonitrile, vinyl alkyl ethers, and vinyl halides; and partial hydrolysis products thereof.

13. The method of claim 8, wherein based on the weight of polymer, the inert ingredients are added in amounts from about ten percent to about eighty percent by weight, and the amount of bonding agent varies from about one-tenth percent by weight to about twenty percent by weight.

14. The method of claim 13, wherein the inert ingredients are added in amounts from about 40 percent to about 60 percent by weight, and the amount of bonding agent varies from about 1 percent to about 10 percent by weight.

* * * * *